(12) United States Patent
McCabe

(10) Patent No.: US 7,832,757 B2
(45) Date of Patent: Nov. 16, 2010

(54) FOLDING STROLLER WITH DECORATIVE SKIRT

(76) Inventor: Michael P. McCabe, 11041 Legacy Blvd., #104, Palm Beach Gardens, FL (US) 33410

( * ) Notice: Subject to any disclaimer, the term of this patent is extended or adjusted under 35 U.S.C. 154(b) by 639 days.

(21) Appl. No.: 11/487,660

(22) Filed: Jul. 17, 2006

(65) Prior Publication Data
US 2007/0018432 A1 Jan. 25, 2007

Related U.S. Application Data

(60) Provisional application No. 60/700,495, filed on Jul. 19, 2005.

(51) Int. Cl.
*B62B 7/08* (2006.01)
(52) U.S. Cl. .................. 280/650; 280/827
(58) Field of Classification Search ............. 280/827, 280/1.22, 1.23, 641, 642, 643, 644, 647, 280/648, 650, 657, 658, 47.38, 47.4; D12/128, D12/129, 131, 133
See application file for complete search history.

(56) References Cited

U.S. PATENT DOCUMENTS

| | | | | |
|---|---|---|---|---|
| 2,775,462 A * | 12/1956 | Biasell | ................. | 280/827 |
| 2,998,979 A * | 9/1961 | Sandell | ................. | 280/87.05 |
| 4,089,543 A * | 5/1978 | Osborne | ................. | 280/647 |
| 4,132,429 A * | 1/1979 | Woods | ................. | 280/647 |
| 4,949,740 A * | 8/1990 | Friday | ................. | 135/90 |
| 5,076,599 A * | 12/1991 | Lockett et al. | ................. | 280/204 |
| 5,125,674 A * | 6/1992 | Manuszak | ................. | 280/30 |
| 5,125,712 A * | 6/1992 | Stamoutsos | ................. | 280/47.38 |
| 5,263,730 A * | 11/1993 | Roach et al. | ................. | 280/47.4 |
| 5,318,318 A * | 6/1994 | Berner et al. | ................. | 280/204 |
| D361,049 S * | 8/1995 | Beckman | ................. | D12/129 |
| 5,975,613 A * | 11/1999 | Sippel | ................. | 296/77.1 |
| 6,250,652 B1 * | 6/2001 | Nelson | ................. | 280/47.38 |

* cited by examiner

*Primary Examiner*—Frank B Vanaman
(74) *Attorney, Agent, or Firm*—Fox Rothschild, LLP; Robert J. Sacco

(57) ABSTRACT

A folding stroller having a structural frame formed of a plurality of rigid support members. The stroller is provided with a skirt formed of a flexible material. The skirt can be disposed around at least a portion of an outer perimeter of the stroller to create a visual impression of something other than an ordinary stroller. For example, the skirt can create a visual impression of a vehicle such as an automobile, truck, airplane, spacecraft, an animal or a character. The skirt can be formed of fabric, plastic sheeting or film, or a mesh. A suspension frame is provided for suspending the skirt along a least a portion of an upper edge thereof. The suspension frame can at least partially define a profile of the vehicle, animal or character. The suspension frame folds with the structural frame of the stroller for ease of storage.

23 Claims, 7 Drawing Sheets

FOLDING STROLLER WITH DECORATIVE SKIRT

CROSS REFERENCES TO RELATED APPLICATIONS

This application claims benefit of U.S. provisional patent application Ser. No. 60/700,495 filed Jul. 19, 2005, which is herein incorporated by reference.

BACKGROUND OF THE INVENTION

1. Statement of the Technical Field

The invention relates generally to strollers for children, and more particularly to a collapsible stroller incorporating a decorative skirt for giving the stroller the appearance of something other than a stroller.

2. Description of the Related Art

Strollers for transporting young children are well known in the art. Strollers are typically formed from metal tubing, various structural plastic components, cushions and fabric coverings. These components are generally arranged to form a child seat on wheels that can be pushed by an adult. Often, the seats are designed to recline for child comfort. A wide variety of stroller designs are available and well known in the art. In general these designs are sturdy and perform quite well.

Within the broad class of strollers that are commercially available, there exists a particular type of stroller that is relatively light in weight and which is designed so that it can be collapsed for compact storage. Typically, rigid metal and plastic structural elements forming such strollers are connected together with various linkages that permit the components to change orientation or move relative to one another. These linkages typically include pivot connections, sliding links, and various other movable connections. These linkages generally allow elongated structural components of the stroller to be oriented so that they are substantially aligned in the same orientation when collapsed. Consequently, such strollers can be easily collapsed and stored compactly when not in use.

Colors and fabrics of strollers are usually chosen to be attractive to adults and/or children. Generally, the seat fabrics, sun-shade and other portions of the stroller are covered with a fabric, color or design intended to enhance the overall appearance of the product. While these designs are usually tasteful and attractive to adults, they do little to spark the imagination of the children who ride in them. Still, such strollers inevitably must be lightweight, collapsible and functional, so there are limited options available for a designer wishing to provide an imaginative design for children.

In contrast, strollers that are not designed to be collapsed can allow designers greater latitude in the stroller design. For example, the appearance of the stroller can be modified to resemble something other than a stroller. This can be accomplished by means of body panels and parts that are attached to the stroller so that the stroller will resemble something exciting or fun for children. However, such arrangements are not very practical for conventional folding strollers where convenience and weight are key concerns. The decorative framework and panels generally tend to make the folding stroller heavy and impractical to transition to a folded condition.

SUMMARY OF THE INVENTION

The invention concerns a stroller having a structural frame formed of a plurality of elongated rigid support members. One or more of the rigid support members are provided movable relative to each other for modifying the stroller between a first configuration in which the stroller is configured for use for transporting a child, and a second configuration in which the stroller is configured for compact storage. A seat is supported on the structural frame and a plurality of wheels are attached to a portion of the structural frame and positioned for rolling the stroller when it is in at least the first configuration.

At least one handle can be attached to the structural frame for pushing the stroller on the plurality of wheels. The stroller is also provided with a skirt formed of a flexible material. The skirt is disposed around at least a portion of an outer perimeter of the stroller to create a visual impression of something other than an ordinary stroller. For example, the skirt can create a visual impression of a vehicle such as an automobile, truck, airplane, spacecraft, or an animal or character. The skirt can be formed of fabric, plastic sheeting or film, or a mesh. A suspension frame is provided for suspending the skirt along a least a portion of an upper edge thereof. The suspension frame at least partially defines a profile of the vehicle, animal or character.

The stroller includes a pair of bottom frame members located a predetermined distance beneath the seat. The predetermined distance prevents the child seated in the seat from contacting the bottom frame members. The bottom frame members are disposed downwardly in a unshaped configuration forming a recess. The recess receives the bottom of the seat. The recess allows the child to be seated lower in the stroller than in conventional strollers for giving the child a feeling of being seated in a race car. The child's legs can also be extended when seated in the stroller for further mimicking how a race car driver sits in a race car. For this reason, the bottom frame members have longitudinal axes oriented in a direction parallel to the walking surface.

A sun shade is provided attached to the stroller extending over at least a portion of the seat. The sun shade is pivotally attached to the structural frame and is movable between a first unfolded configuration and a second folded configuration. The sun shade is folded on top of the at least one handle when repositioning the stroller from a first unfolded configuration to a second folded configuration. The at least one handle is folded on top of the seat when repositioning the stroller from a first unfolded configuration to a second folded configuration. A mesh is suspended from the sun shade to mimic the netting or mesh of a race car. The mesh is folded over onto the top of the sun shade when the sun shade is moved between the first unfolded configuration and the second folded configuration. The mesh includes one or more edges simulating frame members of a race car.

DETAILED DESCRIPTION

Figure 1:
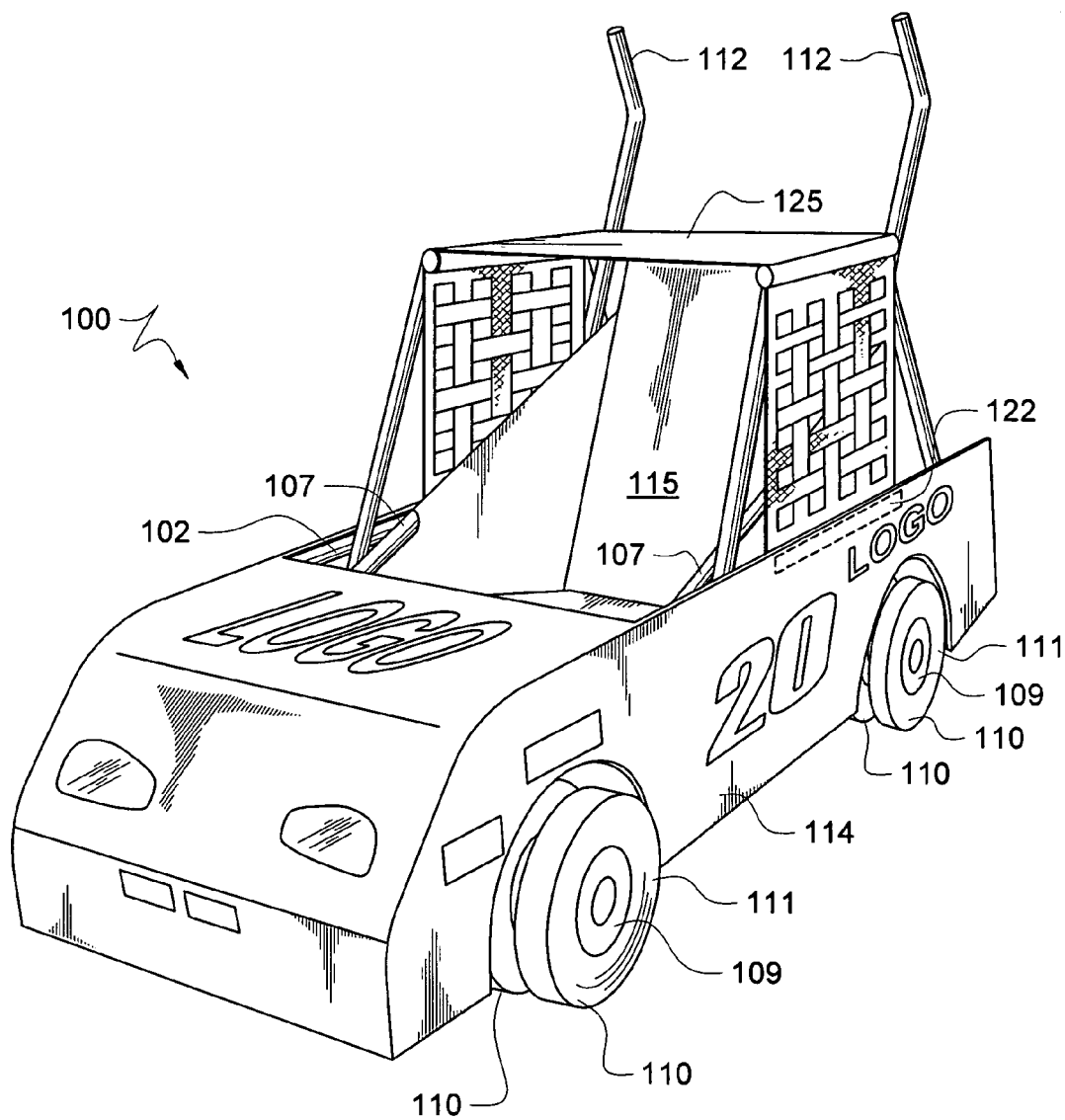
FIG. 1 is a perspective view of a folding stroller in an unfolded configuration that is useful for understanding the invention.
Figure 2:
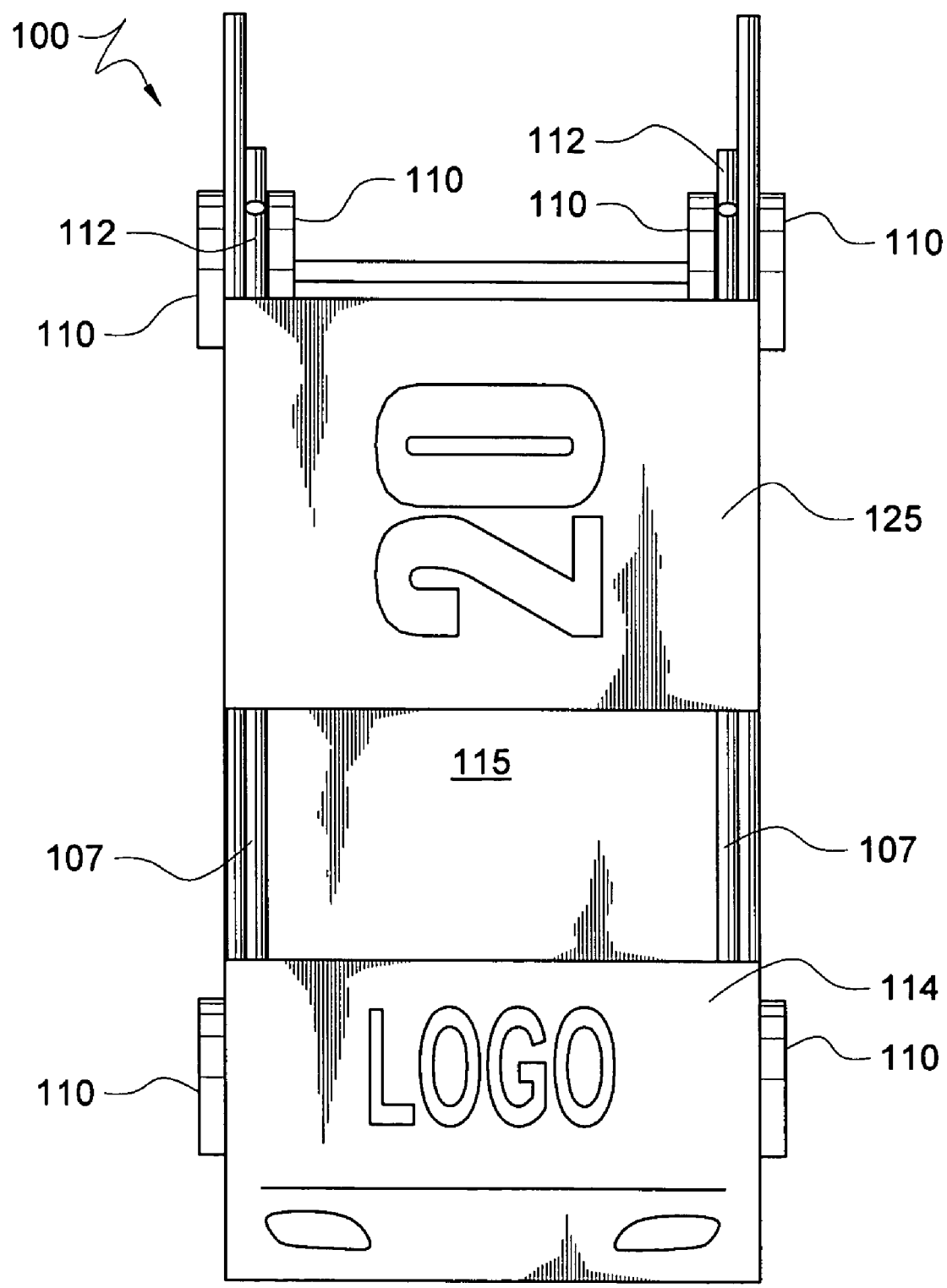
FIG. 2 is a top view of the folding stroller of FIG. 1.

Referring to FIGS. 1 and 2, shown is a folding or collapsible stroller 100 that is useful for understanding the invention. The stroller 100 includes integral design features that make the stroller more visually exciting for children. In a first configuration shown in FIGS. 1 and 2, stroller 100 is configured for use in transporting a child. In a second configuration, described further hereinbelow, the stroller is collapsed or folded into a second configuration for compact storage. The stroller can include a seat 115 where a child is seated within a space at least partially defined by the seat 115, a sun shade 125 extending over at least a portion of the seat 115, a structural frame 102 that is similar to conventional folding frame strollers, and a decorative skirt 114. The structural frame 102 is at least partially surrounded by the decorative skirt 114 that can at least partially define a profile of something other than an ordinary stroller.

A plurality of wheels 110 can be attached to a portion of the structural frame 102 at positions suitable for rolling the stroller 100 over a walking surface. In the preferred embodiment of the invention, the plurality of wheels 110 includes a pair of wheels 110 positioned on a common axle and positioned adjacent to each other separated by a portion of the structural frame 102. The double wheel or pair configuration provides greater stability for the stroller 100 over a conventional single wider wheel configuration while reducing rolling friction as the stroller is pushed over the walking surface. In an alternate embodiment of the invention, the double wheel configuration can be replaced with a more conventional single wheel configuration.

The wheels 110 of the stroller 100 can be formed as ordinary stroller wheels. However, according to a preferred embodiment, the stroller wheels 110 can be sized, shaped and/or colored to mimic a race car wheel and tire. For example, the tire portion 111 of the wheels can be colored black, can have a wider profile as compared to ordinary stroller wheels, and/or can have lettering disposed thereon to mimic an automobile tire. The interior rim 109 of each wheel can be similarly designed to mimic a race vehicle wheel.

One or more handles 112 can be provided, attached to the structural frame 102, for pushing the stroller 100 on the plurality of wheels 110. The structural frame 102 can include a pair of opposing seat support frames 107 for supporting seat 115. The seat 115 can be formed of a flexible material that can be tensioned between opposing sides of the seat support frames 107. The use of a flexible material for seat 115 allows seat 115 to be easily compacted between seat support frames 107 when stroller 100 is moved from the first configuration to the second configuration.

Figure 3:
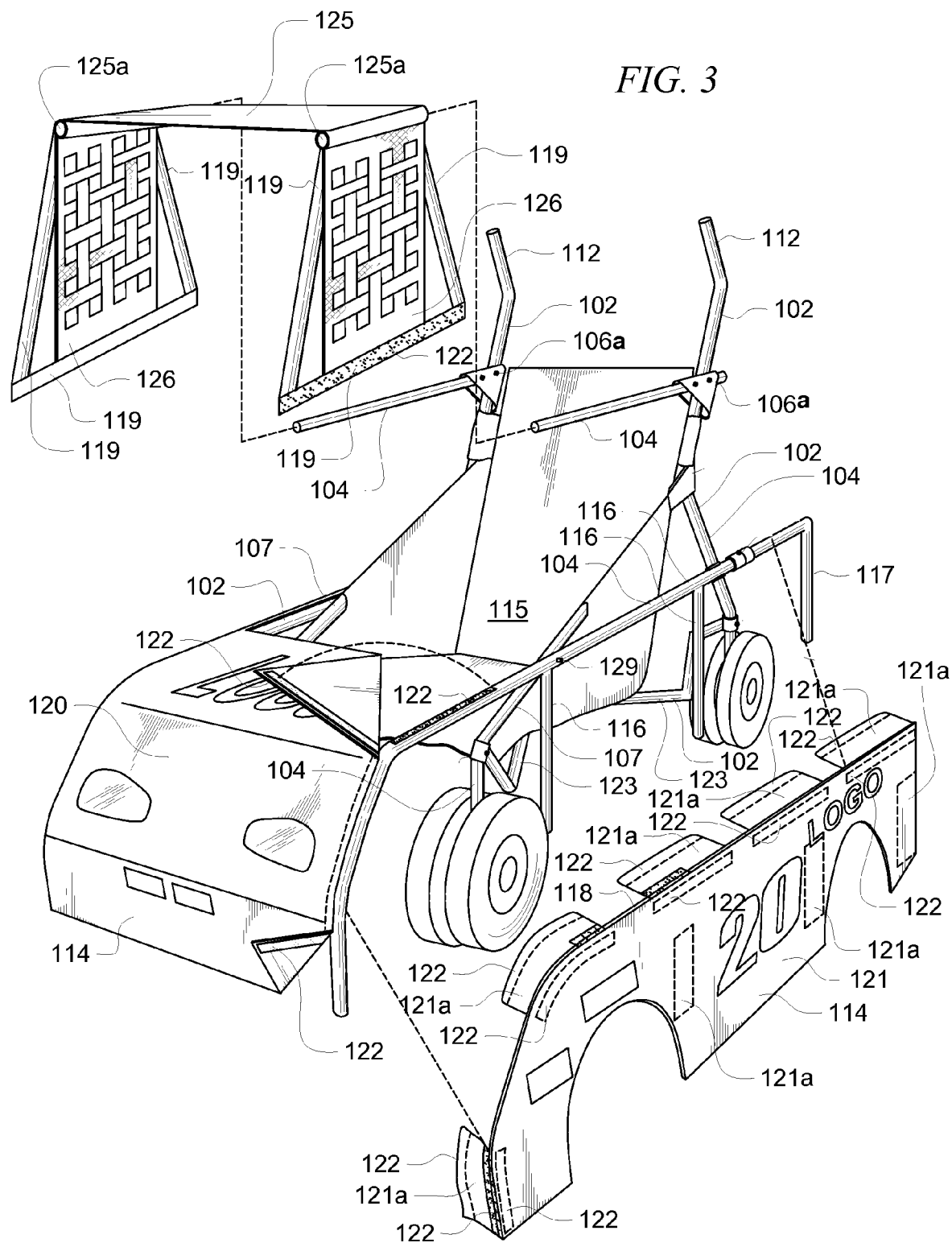
FIG. 3 is a partially exploded perspective view of the folding stroller of FIG. 1.

Referring now to FIG. 3, the structural frame 102 can be formed of a plurality of elongated rigid support members 104. The rigid support members 104 can be formed of rigid metal, plastic, or composite tubing as is common among stroller designs of the foregoing type. In this regard, it should be understood that the invention is not limited with respect to the particular size, shape, profile or material of the rigid support members 104. A wide variety of shapes, profiles, and materials are conventionally used to form the rigid support members 104. Accordingly, all such materials are intended to be within the scope of the present invention.

In accordance with conventional folding stroller design, one or more of the rigid support members 104 can be attached to one another by linkages 106*a*, 106*b*, 106*c*, 106*d*, 106*e* that allow the support members 104 to be moved relative to one another for the purpose of modifying the configuration of the stroller 100. In FIGS. 3-9, linkages 106*a*, 106*b*, 106*c*, 106*d*, 106*e* are shown as pivot linkages. However, those skilled in the art will appreciate that the particular linkages used will depend upon the manner in which the stroller is intended to fold. Thus, linkages 106*a*, 106*b*, 106*c*, 106*d*, 106*e* can include any type of linkage that may be suitable for permitting the various rigid support members 104 to change position or orientation relative to one another as may be appropriate for a particular folding system. Accordingly, the invention is not limited to the particular structural frame and folding arrangement shown. Instead, the invention can also include strollers having various types of sliding linkages, extendable linkages, and so on to implement any of a wide variety of known folding arrangements.

It should be understood that the invention is not limited to any particular arrangement of the rigid support members 104 or structural frame 102. Instead, the present invention can be used with structural frames having any of a variety of different types of rigid supports 104 in any of a variety of configurations and attached to one another by any one of a variety of linkage arrangements presently known or known in the future. In this regard, it will be appreciated that the particular arrangement of structural frame 102 is shown as merely one possible example.

In FIG. 3, it can be observed that a skirt 114 can be disposed around at least a portion of an outer perimeter of said stroller 100. The skirt can be formed of any thin lightweight highly flexible material. For example, the skirt can be formed of fabric, plastic film, or mesh. The skirt 114 can be held in position by a suspension frame 116 that suspends the skirt 114 along at least a portion of an upper edge 118 thereof. The suspension frame 116 can be formed of the same material as the rigid support members 104 including rigid metal, plastic, or composite tubing. In this regard, it should be understood that the invention is not limited with respect to the particular size, shape, profile or material of the suspension frame 116. Accordingly, all such materials are intended to be within the scope of the present invention.

Figure 9:
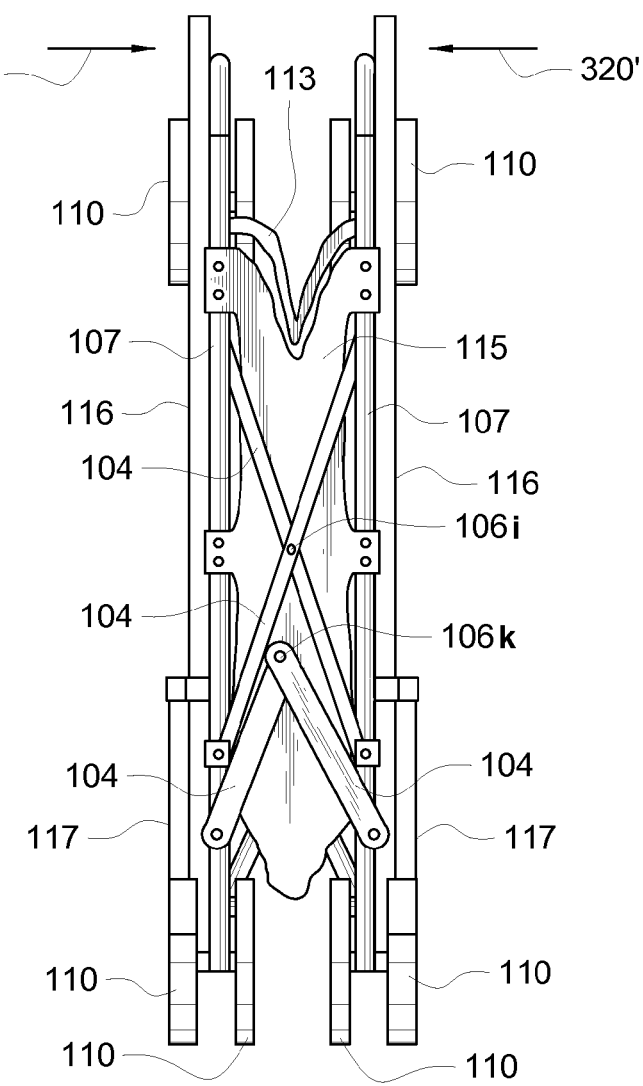
FIG. 9 is a top view of the stroller of FIG. 1 in the fully folded configuration.

The suspension frame 116 can also include one or more vertical suspension frame members 116 extending downwardly from suspension frame 116 for further supporting and holding skirt 114 into position. The suspension frame 116 can be formed as a single continuous rod that extends in a U-shaped profile around the front of the stroller 100. Alternatively, the suspension frame 116 can include a pair of opposing L-shaped rods. The use of two separate L-shaped rods can be more convenient for allowing the opposing sides of the stroller frame 102 to be collapsed inwardly toward one another as shown in FIG. 9. In this way, the skirt 114 can fold or flex as the stroller 100 is collapsed.

According to one embodiment of the invention, the suspension frame 116 can be attached to at least one of the rigid support members 104 comprising frame 102 by means of a movable joint. For example, the suspension frame 116 can be attached by means of at least one pivot connection 129 so that the suspension frame 116 can be aligned with one or more of the rigid support members 104 when the stroller is modified to conform to the second configuration shown in FIGS. 8 and 9. Still, the invention is not limited in this regard and any other type of suitable attachment mechanism can also be used for this purpose, provided that the stroller 100 can be collapsed for compact storage.

According to a preferred embodiment of the invention, the suspension frame 116 and the skirt 114 can at least partially define a profile of something other than an ordinary stroller. For example, the skirt 114 and the suspension frame 116 can define the outlines of an automobile, truck, rocket, animal, character, and so on. If the skirt 114 and the suspension frame 116 define an automobile, then the outline can be styled to mimic the appearance of particular types of vehicles. For example, the skirt 114 and the suspension frame 116 can be designed to create the impression of a race car for greater visual impact. For added visual attraction, graphics can be applied to the surface of the skirt 114. For example, if the skirt 114 and the suspension frame 116 are designed to create the appearance of an automobile profile, then the skirt 114 can be provided with race car graphics. The race car graphics can include logos, numbering, or other graphics.

Figure 6:
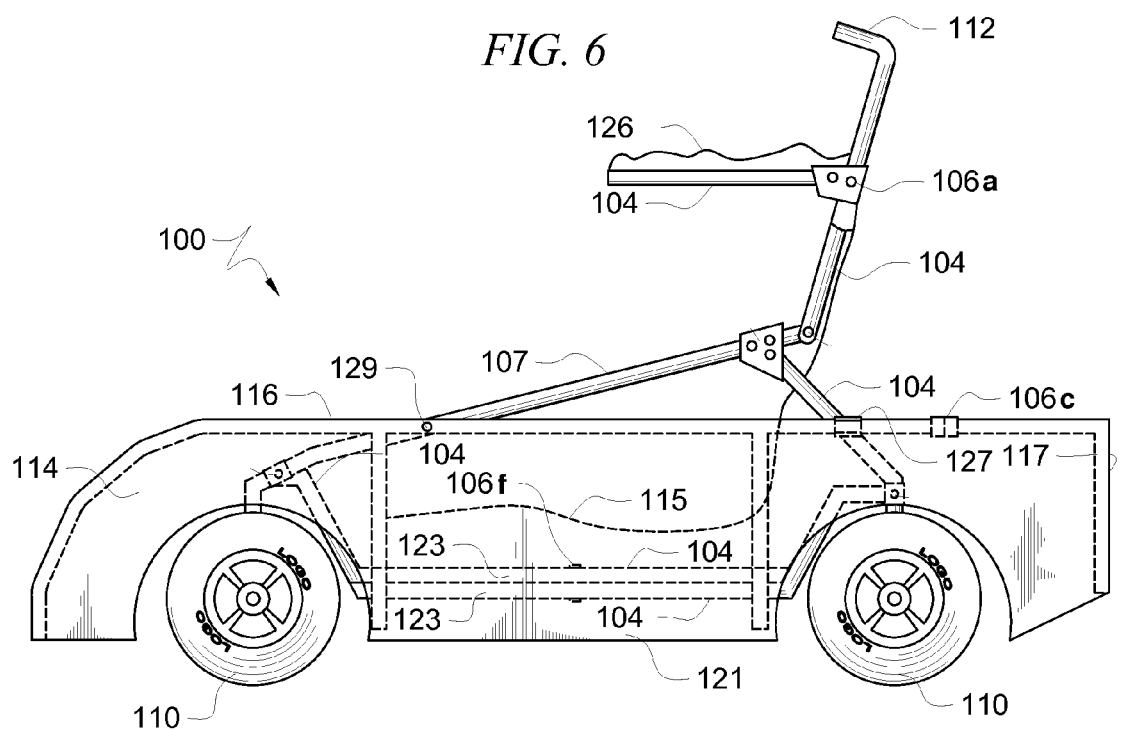
FIG. 6 is a side elevation view of the folding stroller of FIG. 1 in a partially folded configuration.
Figure 7:
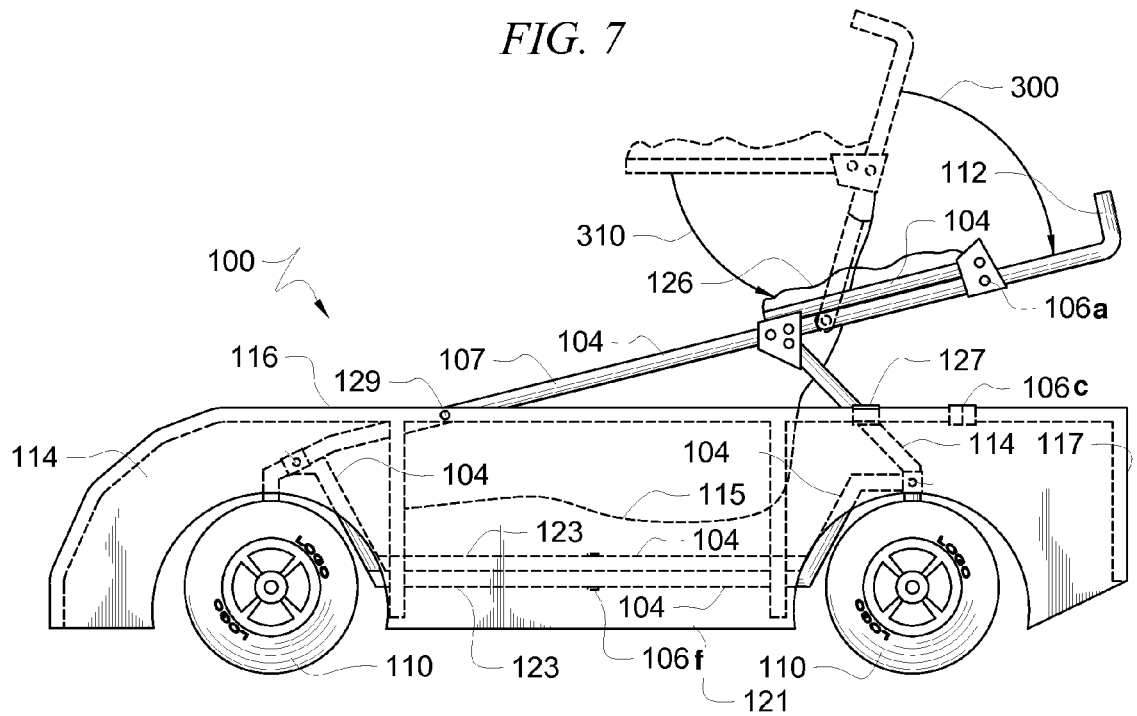
FIG. 7 is a side elevation view of the folding stroller of FIG. 1 in a partially folded configuration.
Figure 8:
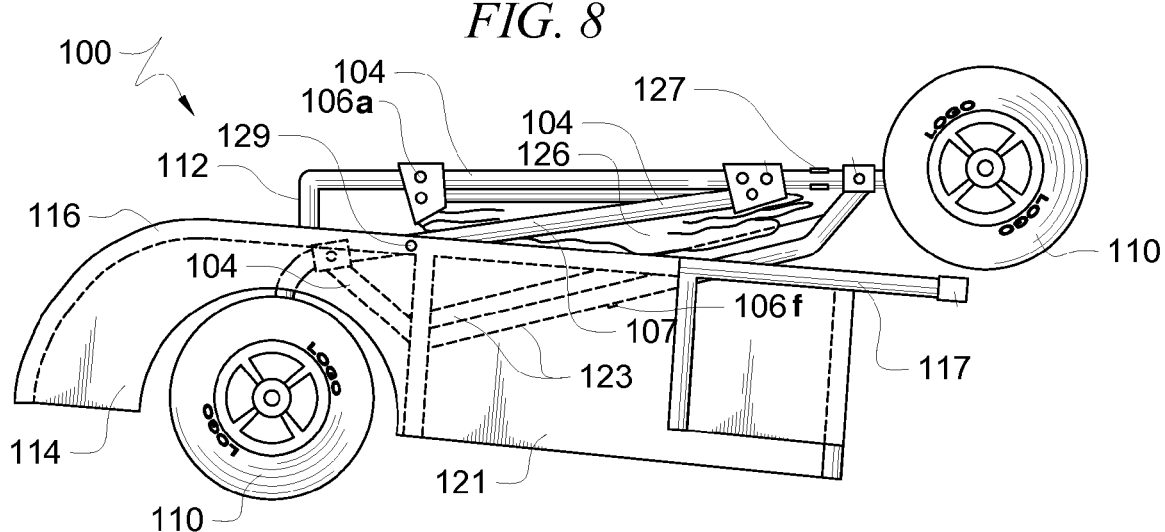
FIG. 8 is a side elevation view of the folding stroller of FIG. 1 in a fully folded configuration.

A sun shade 125 can be attached to the stroller 100 in the manner of a conventional stroller. For example, the sun shade 125 can be attached to the stroller 100 with channels 125a sewn into opposing edges of sun shade 125 and slid onto a pair of opposing rigid support members 104. However, this method of attaching sun shade 125 to rigid support members 104 is not limiting as other methods well known in the art could be used. The rigid support members 104 are pivotally attached to frame 102 with linkages 106a which can be a locking linkage such as the push button type linkage previously described or other type of linkages that are well known in the art. The linkage 106a locks the rigid support members 104 supporting sun shade 125 into a first configuration as shown in FIGS. 1-3, and when unlocked, allows the rigid supports members 104 and sun shade 125 to be folded into a second configuration for storage. The operation of linkages 106a and sun shade 125 are best seen in FIGS. 6-8 and described further hereinbelow.

The sun shade 125 can extend over at least a portion of the seat 115 as is well known to those in the art. However, if the skirt 114 is designed to mimic a race car, then the sun shade 125 can have a black netting material 126 that mimics the safety netting commonly found on many race cars. As with the fabric skirt 114, the netting material 126 can create an exciting visual impression while still maintaining ease of stroller folding and storage. Like the skirt 114, the black netting 126 can convey a race car impression, without adding significant weight to the stroller 100. The black netting material 126 can include one or more edges 119 formed of a material such as fabric for mimicking a frame member of the race car. The one or more edges or simulated frame members 119 at least partially surround the periphery of the black netting material 126. The simulated frame members 119 simulate the frame members of an automobile that normally support the windshield and roof of the automobile. For example, in FIG. 3 there is a frame member 119 extending from the front and rear edges of netting material 126. There is an additional strip of material 119 along the bottom edge of netting material 126 so that a fastener such as a hook and loop fastener 122 can be used to secure the black netting material 126 to the inner surface of decorative skirt 114 as shown in FIG. 1.

The top of the sun shade 125 (FIG. 2) can also be provided with race car graphics such as logos and/or numbering. In another embodiment of the invention, if the skirt 114 is designed to mimic a conventional automobile or truck, the black netting 126 can be replaced with plastic side windows to more resemble the windows of a conventional automobile or truck.

The decorative skirt 114 can be formed of a single piece of flexible material or can be multiple pieces. If multiple pieces are used, then the flexible material can be attached to the frame 102 using hook and loop fasteners 122 for easy detachment. For example, a front panel 120 can be tensioned between suspension frames 116 disposed on opposing sides of the structural frame 102. These suspension frames 116 are L-shaped for supporting the skirt 114 along at least a portion of an upper edge 118 and at least a portion of front edge thereof.

A side panel portion 121 partially forming skirt 114 can be attached to each of the opposing suspension frames 116 using one or more elongated straps 121a formed along the upper edge 118 of the side panel portion 121. The straps 121a are formed from the same material as side panel portion 121 and are comprised of a portion of the material folded over to wrap around an adjacent portion of the suspension frames 116. A fastener such as hook and loop fasteners 122 can be used to secure the straps 121a to the inner surface of side panel portion 121. The side panel portion 121 is further secured to the suspension frames 116 using one or more straps 121a attached to the inner surface of side panel portion 121. The one or more straps 121a wrap around one or more vertical suspension frame members 116 extending downwardly from suspension frame member 116. The one or more additional straps 121 are secured to the vertical suspension frame members 116 with a fastener such as a hook and loop fastener (not shown).

A pair of L-shaped suspension frames 117 or suspension frame extensions can be attached to each of the suspension frames 116 for supporting a portion of the side panel portions 121 that extend rearwardly over the plurality of wheels 110 comprising the rear wheels of the stroller 100. The suspension frames 117 can be formed of the same material as suspension frame 116 including rigid metal, plastic, or composite tubing. The suspension frames 117 can be attached by a linkage 106c to suspension frames 116 so that the suspension frames 117 can pivot between an unfolded configuration when the stroller is in the first configuration (FIGS. 1-5), and a folded configuration when stroller 100 is repositioned into the second configuration (FIGS. 8-9). The linkage 106c can be any one of the types of the linkages described including a linkage 106c that locks into the various positions and unlocks when it is desired to reposition the stroller 100 back and forth between the first configuration and the second configurations. The linkage 106c can be a linkage that uses a push button configuration to unlock the linkage when repositioning the stroller 100 between the first and second configurations. However, this is not limiting in this regard as there are other types of locking linkages that may be used that are well known in the art.

The side panel portions 121 are attached to suspension frames 117 with one or more elongated straps 121a along the top edge 118 and rear edge of the side panel portions 121. The suspension frames 117 and the side panel portions 121 rearward of the plurality of wheels 110 complete the impression that the skirt 114 and the suspension frame 116 mimic the appearance of a vehicle such as a race car.

Still referring to FIG. 3, the front panel portion 120 of skirt 114 can be configured to be folded back to allow a child to enter into the space partially defined by seat 115 and then to be seated in seat 115. In this manner, a child wishing to be seated in seat 115 does not have to be lifted over front panel portion 120 and placed into seat 115. One or more edges of front panel portion 120 can be secured to suspension frames 116 by hook and loop fasteners 122. The hook and loop fasteners 122 can release one edge of front panel portion 120 so that front panel portion 120 can be folded back and away from the area directly in front of seat 115. A child is then free to walk into the area in front of seat 115 and enter seat 115 unrestricted by front panel portion 120. When the child is seated in seat 115, front panel portion 120 is folded back into position and secured by hook and loop fasteners 122.

Figure 4:
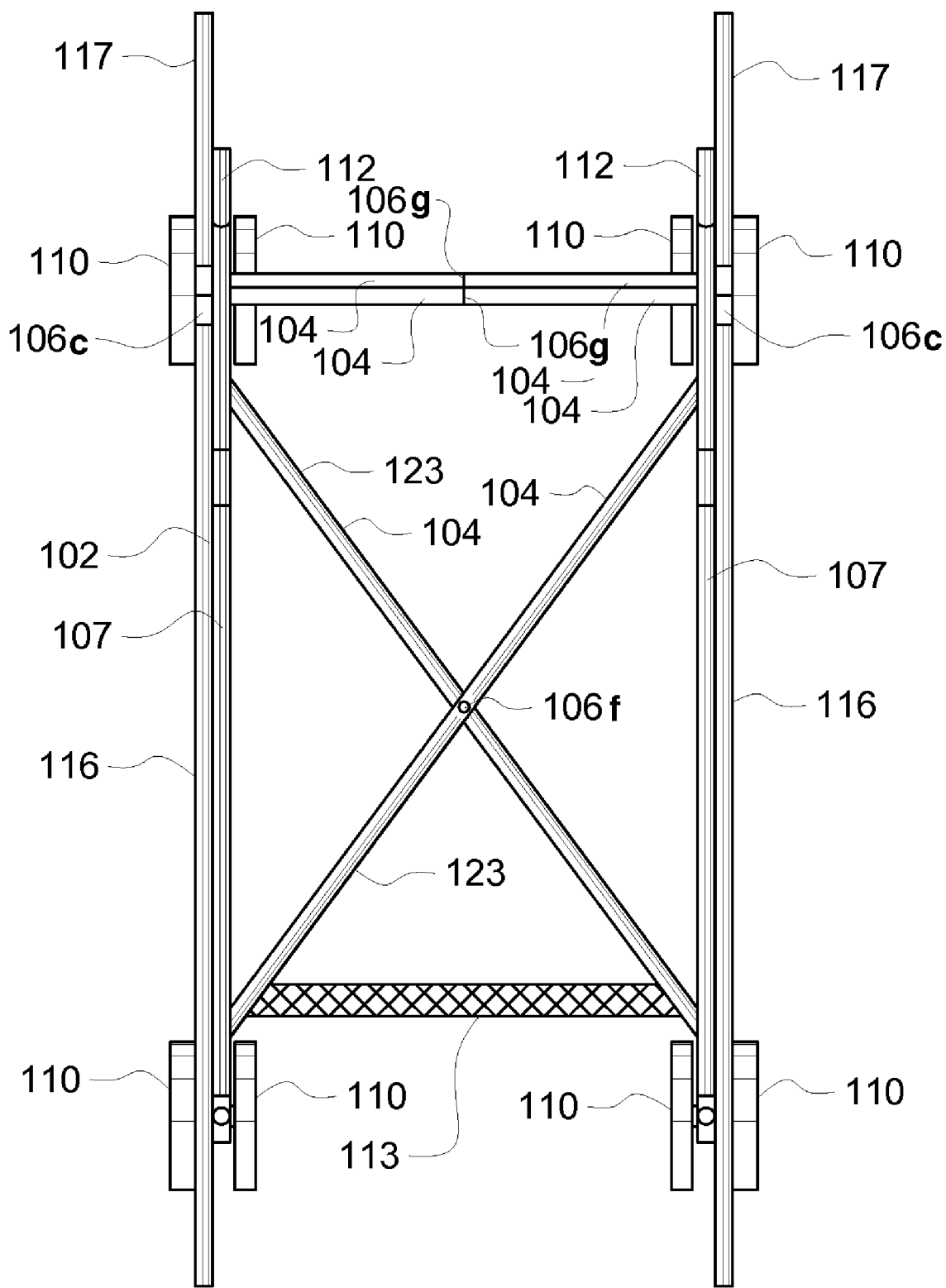
FIG. 4 is a top view of the structural frame, skirt suspension frames, and plurality of wheels of the folding stroller of FIG. 1.

Referring now to FIG. 4, shown is a top view of the structural frame 102, suspension frames 116 and 117, and plurality of wheels 110 that is useful for understanding the invention. The opposing seat support frames 107 partially comprising structural frame 102 are pivotally connected by a pair of rigid support members 104 forming bottom frame members 123 (also partially seen in FIG. 3). The bottom frame members 123 are crossed and pivotally attached to each other at the approximate center by a linkage 106*f*. The linkage 106*f* is a non-locking type linkage which allows the bottom frame members 123 to pivot relative to one another so that opposing seat support frames 107 can be collapsed towards one another. The ends of bottom frame members 123 are pivotally attached to rigid support members 104 comprising structural frame 102 by linkages (not shown). The linkages (not shown) are also a non-locking type linkage which allows the opposing seat support frames 107 to be collapsed towards one another.

Figure 5:
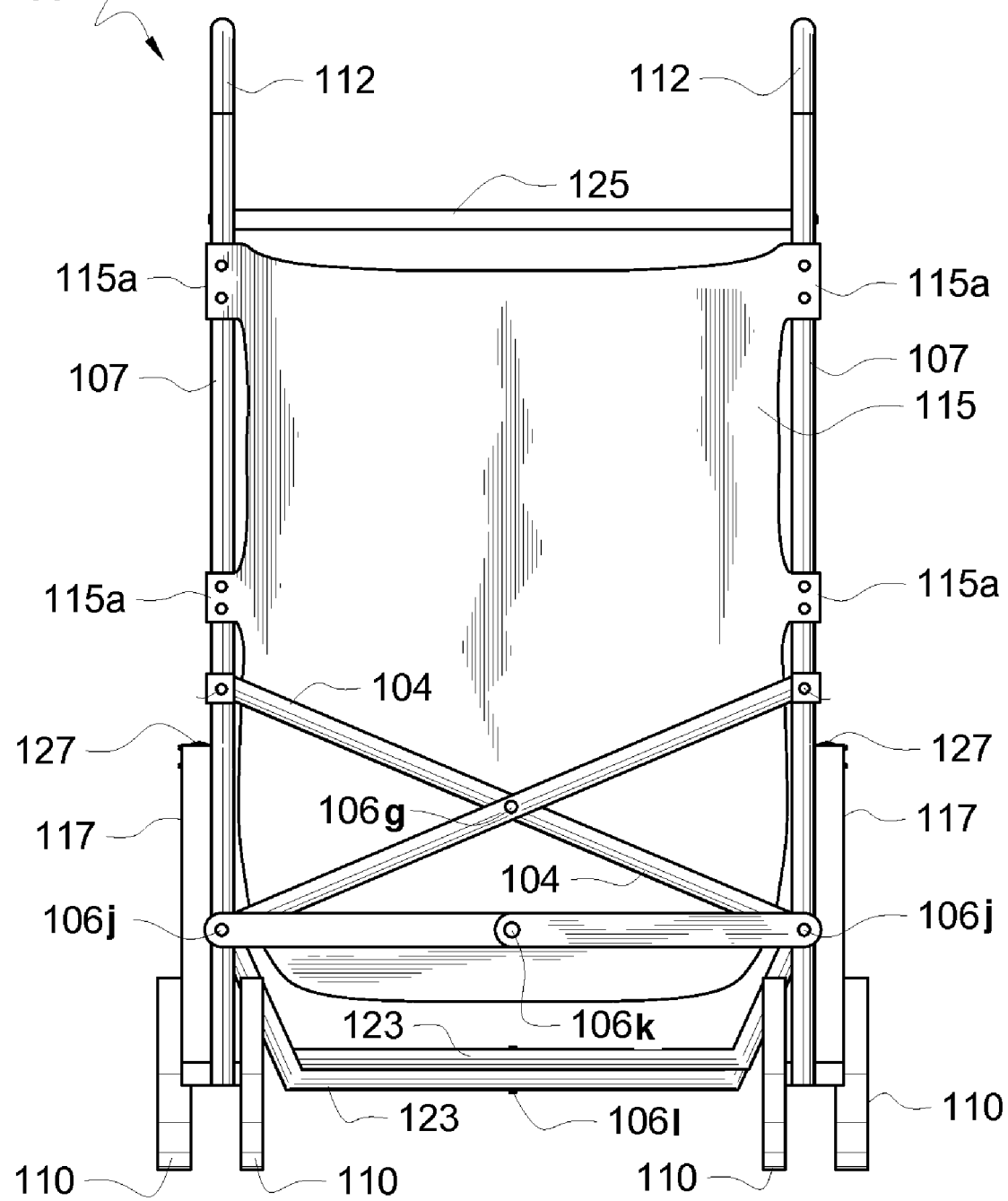
FIG. 5 is a rear elevation view of the folding stroller of FIG. 1.

The opposing seat support frames 107 partially comprising structural frame 102 are also connected at the rear of the stroller 100 by a first pair of rigid support members 104 (best seen in FIG. 5) which are crossed and pivotally attached at the center by a pivot linkage 106*g* (FIG. 5). There is a second pair of rigid support members 104 (best seen in FIG. 5) connecting opposing seat support frames 107 located beneath the first pair of rigid support members 104 at the rear of stroller 100. However, these rigid support members 104 are connected to each other with a linkage 106*k* at one end. The other ends of the rigid support members are connected to the opposing seat support frames 107 with a linkage 106*j* (FIG. 5). The linkages 106*g*, 106*j* and 106*k* are all of the non-locking type which allows the opposing seat support frames 107 to be collapsed towards each other to move stroller 100 to the folded configuration.

The stroller 100 can also include a foot rest 113 that is suspended between bottom frame members 123 towards the front of the stroller 100. The foot rest 113 can be made from a strip of flexible material such as fabric, nylon, or mesh. Still, the selection of the material for foot rest 113 is not limiting as there can be many possible suitable materials as is known in the art. The foot rest 113 is folded when stroller 100 is repositioned from the first configuration to the second configuration.

Referring now to FIG. 5, the stroller seat 115 is attached to the opposing seat support frames 107 partially comprising structural frame 102 by one or more seat attachment straps 115*a*. In the preferred embodiment of the invention, the seat attachment straps 115*a* are comprised of an elongated portion of the material forming seat 115 along the edge of seat 115 folded over and formed into a strap configuration. The strap configuration is wrapped around the rigid support member 104 forming one of the opposing seat support frames 107 and secured thereto with a fastening means such as a rivet, screw or sewing. In this regard, it should be understood that the invention is not limited to any particular arrangement of the means by which seat 115 can be attached to the seat support frames 107 or the fastening means used for securing the strap configuration to the seat support frames 107.

The seat 115 and bottom frame members 123 are designed so that a predetermined distance exists between the bottom of seat 115 and bottom frame members 123 when a child is seated in seat 115. The predetermined distance prevents the child seated in seat 115 to coming into contact with the bottom frame members 123. The bottom frame members 123 are purposefully lower in height as compared to conventional stroller designs and disposed downwardly in a u-shaped configuration. The u-shaped configuration forms a recess for receiving the bottom of seat 115. The bottom of the u-shaped recess rests in a plane that is lower than a plane intersecting the top of the plurality of wheels 110. This allows the child to sit lower in seat 115 as compared to conventional stroller designs. The child can also sit in seat 115 with their legs in an extended position to more closely mimic how a driver sits in the seat of a race car. For this reason, the longitudinal axes of the bottom frame members 123 are in a more generally parallel orientation to the walking surface as compared to conventional stroller designs. Also shown in FIG. 5 is the bottom frame members 123 pivotally connected by a linkage 106*l*. The first and second pairs of rigid support members 104 connecting opposing seat support frames 107 can be seen below handles 112. The suspension frames 117 are seen in the unfolded configuration of FIGS. 1-2 outboard of the opposing seat support frames 107.

Referring now to FIGS. 6-8, it can be observed that the plurality of rigid support members 104 can be repositioned from a first configuration in which the stroller 100 is configured for use in transporting a child. In this configuration, a child can sit in the stroller seat 115 that is supported by the structural frame 102. In the first configuration, the stroller 100 can be pushed along a walkway surface by an adult in the usual manner. The plurality of rigid support members 104 can also be repositioned relative to one another to provide a second configuration for the stroller 100. In the second configuration, the stroller 100 is configured for compact storage.

In one embodiment of the invention, the stroller 100 is repositioned from the first configuration of FIGS. 1-5 to the second configuration of FIGS. 6-9 by detaching the hook and loop fasteners 122 fastening the black netting 126 from the inner surface of skirt 114. In FIG. 6, the black netting material 126 suspended from the sun shade 125 is pulled over the top of sun shade 126 and folded neatly thereon. In FIG. 7, the rigid support members 104 comprising handles 112 are folded downward in the direction of arrow 300 by releasing the locking linkage 106*a*. The sun shade 126 is folded by pushing the rigid support members 104 in the direction of arrow 310 after releasing the locking linkage 106*a*. Sun shade 125 now rests flat against the rigid support members 104 comprising handles 112. The locking linkages 106*c* connecting suspension frames 117 to suspension frames 116 are released so that suspension frames 117 can be folded to the position shown in FIGS. 8 and 9. The flexible material comprising skirt 114 allows suspension frames 117 to be folded from the first configuration to the second configuration.

In repositioning the stroller 100 from the first configuration to the second configuration, suspension frames 116 are disconnected from the rigid support members 104 comprising frame 102 by releasing them from a pair of clamps 127 located on opposing sides of structural frame 102 fastened to the rigid support members 104. The clamp 127 may be a C-clamp for grasping a portion of a tubular member such as the rigid support members 104. However, this is not limiting in this regard as there as other means well known in the art that can be used for connecting suspension frames 116 to the rigid support members 104 comprising frame 102. A portion of the pair clamps 127 can also be seen in FIG. 5 on opposing sides of structural frame 102.

After suspension frames 116 are released from clamps 127, the structural frame 102 is free to pivot about pivot points 129 relative to suspension frames 116 to the position shown in FIG. 8. The rigid support members 104 comprising handles 112 are folded one more time so that the rigid support members 104 comprising handles 112 and sun shade 125 are folded adjacent to the rigid support members 104 comprising the seat support frames 107 and structural frame 102. Finally, the two opposing sides of the structural frame 102 can be collapsed inwardly toward one another in the direction of arrows 320 and 320' as shown in FIG. 9. The collapsing of the two opposing sides of the structural frame 102 causes the bottom frame members 123, the first pair of rigid support members 104 at the rear of stroller 102, and the second pair of rigid support members at the rear of stroller 102 to pivot about their respective linkages 106*i*, 106*k* to a collapsed or folded configuration. It can be advantageous to provide a structural frame 102 that allows the rigid support members 104 to collapse to a position in which they are generally aligned with one another. Exact parallel alignment is not necessary. However, to the extent that the elongated rigid support members 104 can be moved towards an orientation that places them in a generally parallel alignment, they can often be arranged for more compact stowage.

All of the apparatus, methods and algorithms disclosed and claimed herein can be made and executed without undue experimentation in light of the present disclosure. While the invention has been described in terms of preferred embodiments, it will be apparent to those of skill in the art that variations may be applied to the apparatus, methods and sequence of steps of the method without departing from the concept, spirit and scope of the invention. More specifically, it will be apparent that certain components may be added to, combined with, or substituted for the components described herein while the same or similar results would be achieved. All such similar substitutes and modifications apparent to those skilled in the art are deemed to be within the spirit, scope and concept of the invention as defined.

I claim:

1. A stroller, comprising:
    a structural frame formed of a plurality of elongated rigid support members, one or more of said plurality of elongated rigid support members movable relative to each other for modifying said stroller as between a first configuration in which said stroller is configured for use for transporting a child, and a second configuration in which said stroller is configured for compact storage;
    a seat supported on said structural frame;
    a plurality of wheels attached to a portion of said structural frame in a position for rolling said stroller on a walking surface when it is in at least said first configuration;
    at least one handle attached to said structural frame for pushing said stroller on said plurality of wheels;
    a pair of cantilever frame members coupled to said structural frame defining opposing sides of an unobstructed access path to a seat area defined by said seat, each cantilever frame member extending beyond a front set of said plurality of wheels opposed from said handle;
    a decorative skirt formed of a flexible material draped around at least a portion of an outer perimeter of said stroller, and said cantilever frame members suspending said decorative skirt along a least a portion of an upper edge thereof, said decorative skirt extending forwardly beyond said front set of said plurality of wheels; and
    a plurality of mechanical fasteners coupled to at least a portion of said decorative skirt and configured to detachably secure said portion of said decorative skirt to at least one of said cantilever frame member so that said portion of said decorative skirt can be folded back to allow a child to enter into said seat area via said unobstructed access path, without being lifted over said decorative skirt and any portion of said structural frame;
    wherein said cantilever frame members and said decorative skirt in combination at least partially define a profile that mimics an appearance of a motorized vehicle selected from the group comprising an automobile, a truck, a boat, a rocket, a space craft and an airplane.

2. The stroller according to claim 1, wherein said decorative skirt is formed from a material selected from the group consisting of a fabric, a flexible plastic film, and a mesh.

3. The stroller according to claim 1, wherein said plurality of rigid support members are formed from a material selected from the group consisting of metal, plastic or composite tubing.

4. The stroller according to claim 1, wherein each said cantilever frame member is formed from a material selected from the group consisting of metal, plastic or composite tubing.

5. The stroller according to claim 1, wherein said decorative skirt is further comprised of one or more elongated straps disposed around a periphery of said decorative skirt for attaching said decorative skirt to said cantilever frame members.

6. The stroller according to claim 1, wherein said decorative skirt is collapsed when said stroller is in said second configuration.

7. The stroller according to claim 1, wherein at least one of the said cantilever frame members is pivotally mounted relative to at least one of said rigid support members.

8. The stroller according to claim 1, wherein said cantilever frame members are pivotally attached to said suspension structural frame for supporting a portion of said decorative skirt, said cantilever frame members being movable between a first configuration and a second configuration.

9. The stroller according to claim 1, wherein, said cantilever frame members and said decorative skirt collectively have a profile that generally conforms to the appearance of a race car.

10. The stroller according to claim 9, wherein said plurality of wheels of said stroller are shaped and colored to mimic a race car wheel and tire.

11. The stroller according to claim 1, further comprising a sun shade attached to said stroller, said sun shade extending over at least a portion of said seat.

12. The stroller according to claim 11, wherein said sun shade is pivotally attached to said structural frame and is movable between a first configuration and a second configuration.

13. The stroller according to claim 12, further comprising a mesh suspended from said sun shade to mimic the mesh of a race car.

14. The stroller according to claim 13, wherein said mesh is folded onto said sun shade when said sun shade is moved between said first configuration to said second configuration.

15. The stroller according to claim 14, wherein said mesh includes one or more edges mimicking a frame member of a race car.

16. The stroller according to claim 11, wherein said sun shade is folded on top of said at least one handle when repositioning said stroller from a first unfolded configuration to a second folded configuration.

17. The stroller according to claim 1, wherein said at least one handle is folded on top of said seat when repositioning said stroller from said first configuration to said second configuration.

18. The stroller according to claim 1, further comprising a pair of downwardly disposed bottom frame members forming a u-shaped recess for receiving a bottom of said seat.

19. The stroller according to claim 18, wherein a plane defined by said bottom of said seat is aligned at or below a level defined by a plane intersecting a top of said plurality of wheels.

20. The stroller according to claim 1, wherein said decorative skirt extends beyond a rear set of said plurality of wheels.

21. The stroller according to claim 1, wherein said motorized vehicle is an automobile or truck and said decorative skirt defines at least one wheel well opening of said automobile or truck aligned with one of said plurality of wheels, said wheel well opening generally extending around at least an arcuate portion of an outer diameter of said wheel.

22. The stroller according to claim 1, wherein said decorative skirt covers substantially all of a lower half of said structural frame.

23. A stroller, comprising:
- a structural frame formed of a plurality of elongated rigid support members, one or more of said plurality of elongated rigid support members movable relative to each other for modifying said stroller as between a first configuration in which said stroller is configured for use for transporting a child, and a second configuration in which said stroller is configured for compact storage;
- a seat supported on said structural frame;
- a plurality of wheels attached to a portion of said structural frame in a position for rolling said stroller on a walking surface when it is in at least said first configuration;
- at least one handle attached to said structural frame for pushing said stroller on said plurality of wheels;
- a pair of cantilever frame members coupled to said structural frame defining opposing sides of an unobstructed access path to a seat area defined by said seat, each cantilever frame member extending beyond a front set of said plurality of wheels opposed from said handle;
- a decorative skirt formed of a flexible material draped around at least a portion of an outer perimeter of said stroller, and said cantilever frame members suspending said decorative skirt along a least a portion of an upper edge thereof, said decorative skirt extending forwardly beyond said front set of said plurality of wheels;
- a plurality of mechanical fasteners coupled to at least a portion of said decorative skirt and configured to detachably secure said portion of said decorative skirt to at least one of said cantilever frame members so that said portion of said decorative skirt can be folded back to allow a child to enter into said seat area via said unobstructed access path, without being lifted over said decorative skirt and any portion of said structural frame;
- wherein said cantilever frame members and said decorative skirt in combination at least partially define a profile that mimics an appearance of an animal.

* * * * *